Patented May 28, 1940

2,202,002

UNITED STATES PATENT OFFICE 2,202,002

COATING AND COLORATION OF GRANULATED MATERIALS

Norman P. Harshberger, Scarsdale, N. Y., assignor to Bakelite Building Products Co., Inc., New York, N. Y., a corporation of Delaware No Drawing. Application June 2, 1936, Serial No. 83,076

10 Claims. (Cl. 91—70)

This invention relates to coated mineral and other granular materials, to their coating and/or coloration, to processes relating thereto, and to artificially formed colored particles. More particularly, it relates to individual particles, for example, mineral particles that have received an enveloping coating or casing of a hydraulic cement and/or an agglutinous emulsion or a mixture containing a hydraulic cement as the principal ingredient. This application is a continuation in part of my copending application Ser. No. 675,451, filed June 12, 1933.

Coated granules have come to be used extensively for the coloration and weather protection of building materials, particularly composition roofing. In the fabrication of the latter type of materials it has been the custom to embed a layer of individual granular particles into the surface of a waterproof fibrous base which has been previously provided with an adhesive layer of bitumen, for instance, asphalt, to receive them. The most desirable granules for this purpose, because of their permanence of color, wearing qualities and density have been the natural stones and, in particular, natural slates. However, the small variety of colors available and the costliness of these particles have led to the coating and coloration of the commonest ones with artificial coatings. These artificial color coatings have taken the form of dyes, paints, varnishes and siliceous mixtures usually air-dried or requiring heat to obtain the expected results. In neither group has consideration been given to the structural relationship of the coating to the particle base. In no instance with these coatings has satisfactory or permanent coloration been obtained; dyes have been unstable and have resulted in staining, paints have lost their color because of the volatile oils used to suspend the coloring matter. Also, due to the drying out of the oils the coatings have cracked and peeled. Varnishes used have had similar disadvantages or have not anchored well to the base particles to which applied. Siliceous coatings of the sodium or potassium silicate types when merely air-dried have been useless because of their water soluble characteristics, the action of rain and other atmospheric elements, causing the coating to soften and wash off. Further, those coatings given high heat treatments and/or the combination of heat treatments and the addition of chemicals in their mixture and/or chemical treatments to overcome the solubility of the coating also are not always permanent. In most cases the insolubility has only extended to the surface film and, further, the coatings have been subject to cracking, during heat treatment, by abrasion during handling and by exposure to the elements. Also, the means employed for attempting to overcome the solubility of the coating have had detrimental effects upon the coloring pigments employed, resulting in loss of color and brilliancy. In some instances, disintegration of the particles themselves has occurred; the latter being believed particularly true in the case of porous slag particles coated with silicates, as such coatings do not overcome the physical shortcomings of the slag core and the coating defects soon rendered the slag core open to attack. In addition the processes employed have been of a critical nature, requiring great care in manipulation, constant inspection and many operations, and therefore have been costly. Also, due to the nature of the chemicals employed for the coating, uniformity of color has been difficult to obtain due to the coloring pigments settling out of the composition before application, and efflorescence and dusting of these coatings has been a common occurrence upon exposure to the elements. Moreover, the surface of the granules thus coated is quite smooth and its ability to anchor to the bitumen binder of roofing material is poor, thus causing loss of particles upon exposure.

It has also been proposed to coat stones with ordinary Portland cement, and such is believed to produce an improved product. However, this structure also has certain undesirable features; efflorescence, due to the liberation of calcium salts or calcium hydroxide to the surface of the cement and the consequent formation of calcium carbonate crystals occurs in the freshly formed cement coated particle and continues to appear as the cement ages. Efflorescence is particularly undesirable where the surface is other than white in color as it not only discolors the cement surface of the granule itself, but also affects the cement coloring matter. Further, coated granules under weather exposure receive considerable abrasive action and the granules should therefore present coating material resistant to considerable wear. Ordinary stone coated with ordinary Portland cement will not effectively do this as the coating is substantially confined to the surface and ordinary Portland cement shows considerable wear on exposure and in time exposes the stone core. Thus, unless well anchored, this type of coating may not produce granules satisfactory for roofing purposes and may readily chip or crumble.

It is therefore the general object of this invention to provide coated granules of an improved character, overcoming materially the short-comings of the prior materials and providing coated granules that may be fabricated by simple processes from which heat treatments may be excluded. Also, it is part of the general object of this invention to provide processes of forming artificial particles from prepared material in a liquid or plastic state.

More specifically, the objects of my invention may be enumerated as the provision of—

An improved natural or colored coating for individual granular particles and improved processes and methods of applying the same.

An improved weather resistant coating for individual granular particles comprising a high alumina cement, and an individual granule coated therewith.

An individual granular particle having a substantially permanent colored weather resistant coating with the coloring material thoroughly incorporated with the binding vehicle.

A mineral particle having a set and hardened surface coating presenting a water insoluble film.

An individual granular particle comprising a highly porous granule core and an applied coating that will chemically react with the composition of the granule before setting, and that when fully hardened will have formed substantially an integral mass in which the coating is structurally anchored to the granule core, and will result in a coated particle with improved physical characteristics.

Coated particles for ornamenting building material, particularly roofing, comprising discrete individual mobile particles having a hardened cementitious coating.

Individual mineral particles comprising a slag particle core and an enveloping shell comprising a hydraulic cement.

Particles of granular material to which have been applied a binder, for instance, a hydraulic cement containing a coloring pigment which has been intermittently mixed therewith and which will remain in suspension for a considerable time to permit uniform coloration.

Individual granular particles to which have been applied an emulsion comprising a hydraulic cement and an agglutinous substance in which the agglutinous constituent will surround the particles with an emitted film thereof.

Particles to which have been applied a hydraulic cement coating and thereafter an agglutinous coating to prevent dusting of the cement coating.

Particles to which have been applied a heat hardenable synthetic resin and thereafter baking said particles at a low temperature to solidify the resin coating.

A process of making artificial particles comprising utilizing a viscous liquid, propelling globules of said liquid into space and causing said globules to be transformed into a solid or semi-solid state during their flight.

In fabricating the coated particles of my invention I have found a number of processes readily adaptable. The utility of each is somewhat dependent upon the physical character of the material to be coated or formed. I therefore do not desire to be limited to any one or combination of the methods which I shall hereinafter describe as variations in the means and materials employed will suggest themselves to those conversant in the art, but, however, producing similar results. Also, while the coated granules of my invention are particularly useful as a surfacing for bitumen coated, fibrous base roofing and siding materials, they may be readily adapted for many building and other purposes where the character of surfacing they provide is beneficial.

As a core for the coated granule of my invention I have found it desirable and preferable to utilize individual particles of a porous nature having irregular pitted crevices and irregular craggy outlines. Such particles furnish an excellent surface for coating, and coatings applied thereto become structurally anchored and more capable of resisting chipping and the effects of weather exposure than coatings anchored to particles not possessing these properties. Since the coated granules of my invention are desired especially for roofing and siding materials I further prefer a finished coated granule comparable in weight or less in weight than the slate granules heretofore used. The particles to be coated are therefore also preferably of light mass and possessive of considerable inherent physical strength. Also, I prefer that the particles have a composition that will chemically unite them with the applied coatings hereinafter described.

I have found by practical experiment that mineral particles formed from certain cooled liquid residue or slag in the reduction of metallic ores possess these desirable characteristics. The physical structure of these slags is somewhat dependent upon how they are cooled and upon the temperature and humidity of the surroundings, for instance, slag poured upon a dry bank will be less porous than if poured upon a wet bank. For my purpose I prefer the latter type.

Slags of the type which I prefer to use have a composition similar to certain cements and react with water in a similar manner to certain cements, that is, the alumina and silica minerals of the slag react with water to form hydrated aluminates and silicates. Further, when certain cement coatings are applied, this type of slag reacts much more vigorously in the presence of free lime which may be liberated from the cement, than it will with other materials. I prefer to use slags having ingredients aluminum oxide, silicon oxide and iron oxide of less than 60 per cent (better less than 50 per cent) by weight of these compositions and preferably (not less than) between 20 and 50 per cent, and/or slags preferably between 30 per cent and 70 per cent in their calcium oxide and magnesium oxide content and/or slags having an aluminum oxide and silicon oxide ratio of no less than $\frac{1}{3}$ by weight.

In general, the principal constituents for my coating composition or casing for the granule core comprises a hydraulic cement. Such a combination provides a weather resistant and substantially durable structure having improved properties not found in the coated granules of the prior art. Those cements I have found ordinarily suitable for my purpose on the core I use are ordinary Portland cements; magnesium cements, for instance magnesium oxychloride; ore cements; for substantially white coatings, white Portland cements; but I have found that when as in the instant invention the amount of coating material per granule is relatively small, coatings comprising Portland cements of high early strength (i. e. a cement of substantially pure Portland type which has been given extremely rapid hardening and high early strength characteristics and which gives in two or three days the same mortar strength as do the normal or ordinary Portlands in 28 days) and/or high early strength Portlands which include quick setting characteristics (i. e. acquire initial set in less than ¾ hr.) provide better surfacings and require less processing, as the granule coatings harden more rapidly and obtain considerable strength in the early curing stages. These properties also aid in avoiding rejects due to abrasion in processing and improper hydration.

Moreover, I have found after considerable experimentation that a coating comprising a high alumina cement, herein after more fully described, and which may also be provided with quick setting characteristics produces coated granules with additional beneficial properties not obtainable with the coating materials previously described and is by far the preferred coating for use in my invention.

A coating of this character provides a cementitious weather wear casing that has improved characteristics of strength and hardness to withstand continued exposure to the weather and temperature changes, as well as a high degree of freedom from efflorescence because of soluble salts liberated upon exposure. The composition is further adapted to provide a granule with a surface having an erosion, corrosion and other resistance greater than the cements previously enumerated, since the composition upon hardening provides a denser, sounder and stronger casing than these materials. One reason for this perhaps lies in the fact that a high alumina cement (for similar amounts of gauging water) in hydrating takes up considerably greater quantities of water than other hydraulic cements. Therefore, there is less space occupied by excess water to evaporate and leave unfilled pores. The composition, moreover, has the added quality of hardening more rapidly and obtaining greater strength than, for instance, ordinary Portland cements, such as have been previously employed for coating stone or even those additional Portland cements contemplated hereunder. In fact the composition provides the product with substantially full strength after a short period of cure which may be as little as 24 hours. A particular advantage of the composition, as previously indicated, exists in its corrosion resistance or immunity to the chemical attack by various elements which would affect hydraulic cements of the Portland character. In Portland cements, the principal constituent being tricalcic silicate, monocalcic silicate is formed on hydration and lime is liberated. Certain unstable aluminates are also present in small quantities but the amount of lime liberated on formation of monocalcic silicate is greatly in excess of that which will combine with the aluminates and consequently lime is finally liberated in excess. This free lime readily combines with a multitude of compounds and in the use contemplated by the present invention it will be apparent that such may cause blooming by depositing a scum of calcium carbonate or discoloration may result due to the lime affecting the tinctural value of any pigments present, or, further, the action of the asphalt of the base upon the lime liberated, or the action of air impurities such as are derived from combustion of coals and oils thereupon may subsequently cause loosening of the granule grip upon an asphalt binder and/or disintegration of the Portland cement. Such conditions as previously stated are substantially entirely avoided where a high alumina composition is employed as in such compositions the principal constituent is monocalcic aluminate, and dicalcic aluminate is formed on hydration and also a slight amount of monocalcic silicate. However, the amount of alumina liberated as above is greatly in excess of that required to combine with the lime so that finally gelatinous alumina is liberated in excess, in a free state. The alumina is relatively inert and the aluminates in the set cement are extremely stable; these factors accounting to a large degree for the great resistance of this composition to chemical attack.

Coating or casing compositions of this type for the purposes of this invention comprise as to the cementitious ingredients, high alumina cements, carrying usually between 60 and 95 per cent of calcium aluminates or calcium alumina ferrites, particularly those made by fusion, and when properly so made, substantially entirely free of free lime. It is, however, contemplated by reason of color, though not preferred, to also employ high alumina cements not necessarily made by fusion, which may also include quantities of free lime which, however, have been substantially converted into such products as calcium carbonate in their making as not to react unfavorably for the purposes herein set forth. I have found that a high alumina cement having the following analysis is in general satisfactory:

| | Per cent |
|---|---|
| Silicon dioxide ($SiO_2$) | 6.3 |
| Oxide of iron ($Fe_2O_3$) | 15.4 |
| Aluminum oxide ($Al_2O_3$) | 38.1 |
| Titanium oxide ($TiO_2$) | 2.2 |
| Calcium oxide (CaO) | 36.0 |
| Magnesium oxide (MgO) | 1.0 |
| Sulfur trioxide ($SO_3$) | 0.2 |
| Insoluble residue | 0.6 |

The composition may be varied to allow for differences in processes and raw materials and their accessibility in the various localities, provided, however, that the processes and materials employed lead to a produce of the quality herein contemplated.

Because of the character of coating or casing provided by my high alumina cement composition when hardened, the core of the granule while preferably of a porous type need not be confined to such. Examples of core materials I may employ are individual granules of slag, pebbles, crushed coke, crushed brick, crushed gravel, crushed glass, slate, sand, marble, coral or granulated petrified materials. Other natural or crushed mineral pieces, artificially made particles of mineral material, or particles of organic substances, for instance, cork, may be used where found desirable.

The coating compositions employed in this invention may also include extending materials, and, when combined with a proper amount of water and/or other liquids are such as to yield a hard and dense surface. The extending materials may include coarse and/or fine aggregates, for instance, marble dust, diatomaceous earth, crushed slag, sand, crushed glass, long or short fibres of mineral, animal and/or of vegetable character, such as asbestos, cotton linters, hair, coloring agents, for instance, colored mineral oxides, for example, a chrome or iron oxide, dyes, dry blood, coal tar dyes, natural or synthetic resins which may be oil compositions, and in the case of alumina cements, an acid, for instance, sulfuric acid (which has the property of effecting changes in color) and waterproof and adhesive substances such as asphalt, which may be an emulsified asphalt. These additions, one or more, may be mixed with the cement in such proportions as the character and requirements of the products to be made will allow. The amount of water will depend somewhat upon the type of mix and will readily be determined in actual practice. A water-cement ratio of 0.7-0.9 has in many cases been found satisfactory. Such should be properly controlled in order to insure proper hydration. However, in the case of high alumina compositions excess water may be used in processing without serious effect.

Because of the small quantity of cement composition attached to each particle, it is desirable in certain instances to insure proper hydration, to accelerate the set of the coating. In such instances a quick setting Portland cement may be employed or preferably a high alumina cement is used and given quick setting properties by the addition of calcium sulfate in the form of gypsum or plaster of Paris (commercial grade) in amounts of approximately 2 per cent, which amount may be varied according to the conditions of set acceleration desired and according to the type of and proportion of aggregates included in the cement. Care should be exercised not to include such amounts as will materially affect the durability of the finished product. Incidentally, it should be noted that gypsum would not be expected to produce this result since it is a common ingredient in Portland cements where it produces an opposite effect, that of retarding the set of such materials. Where a slag particle core is used with the high alumina cement composition, such addition may not be necessary as in the chemical combination of these materials any free lime of the slag will tend to accelerate the set.

The aforesaid coating compositions are made up as a slurry, of a dry or wet consistency, as may be desired, and with the material I mix granular particles such as described above which have been previously crushed or screened to the desired size or sizes, and preferably thoroughly washed, and in certain instances dried by passing through a suitable drying chamber. In certain cases I prefer to keep the particles wet, as it assists in the setting of the coating composition. Also, I may, depending on the coating composition employed, use one type of particle or a mixture of several. Further, while individual granules for roofing and siding material of the character to which the invention is particularly directed are generally between about a number 8 and 30 mesh in size, it will of course be understood that the sizes of the pieces coated may be larger or smaller as the case may be.

By suitable means the particles, either wet or dry, are thoroughly mixed with the cement coating composition, the mixture being preferably kept in motion until each particle has been fully coated. Such action is also desirable as the coating material, if it be a colored one, has its pigment kept well distributed. Thereafter the surplus cement, if a thin slurry has been employed, is allowed to run off or is otherwise removed and the coated particles are either kept agitated or passed onto a suitable separating conveyor until they have taken their initial set, or they may be permitted to set and harden in bulk. In the latter instance, if the particles are somewhat bonded together I may put the mass through a crushing process to again separate the particles. In any case, depending upon the surface desired, the coated granules after setting, are permitted to harden at any desired rate by suitable controlling means regulating the moisture conditions surrounding the particles.

Another process of coating, I have found satisfactory, comprises feeding onto a screen type conveyor, particles that have been washed or that are to be washed while in motion by a water spray or by passing through an agitated water bath and thereafter applying the hydraulic cement coating by suitable means as by spraying or impelling to the particles. The surplus material, if a slurry is permitted to drain off and is forced through the cement conveyor apertures into suitable collecting receptacles and the individual particles are then permitted to set and harden after which they are collected for any further processing.

An additional process of coating that may be utilized, and which is particularly adapted to coating porous particles comprises using relatively moisture-free particles of preferably substantially uniform size, and placing a batch of such pieces in or on a suitable device to which there is added a measured amount of dry pulverulent cement of the types hereinbefore mentioned, and preferably of a size about a 400 mesh, although coarser material may be employed under certain conditions. This aggregate is agitated or mixed thoroughly to permit the minute parts of the dry coating to cling to the surface of the particle where a porous particle is being used to permit the material to fill all voids. Simultaneously or otherwise moisture may be introduced into the aggregate of particles, by suitably injecting steam or vapor or moisture laden air or by allowing the moisture to filter through the aggregate to be absorbed by the cement, causing it to set and harden. The use of a relatively moisture-free particle will permit the finely divided coating material to get into the voids without much loss in mixing and before the cement has set. In the above step, if desirable, the particles instead of being mixed with the pulverulent moating material, may have said material sifted or blasted upon them while the particles are kept in motion, the moisture again being introduced at any desired time. Also, the particles, especially those of a dense type, may be wetted first and then tumbled over a surface covered with a layer of dry coating material, thereby coating themselves.

In the process described, I have also found it to be advantageous in certain instances to help control the hardening of the coating, to aid in the retention of color where certain types of coloring materials are used for economy, and to prevent dusting and efflorescence where curing conditions are not favorable or where the coating has not been otherwise treated or is not itself substantially immune therefrom to add to the coating composition at any time, agglutinants, for instance, a wax, an oil or an asphalt of a nature that will not weaken its setting qualities, or, I may also use, for instance, such materials as varnishes comprising natural resins or gums, synthetic resin compositions, which may also be oil-compositions, of which Bakelite and Vinylite are examples, in suitable solvents. In any instance, I may use one or a combination of two or more in a combined form, in an emulsified state or otherwise. Where a hard wax is employed I prefer it to be in an emulsified state. Also, the material may be transparent or contain color.

I have found that most suitable amount of agglutinant to be added to the cement coating, to be from a fraction of one per cent to ten per cent, depending upon the agglutinant used. When the agglutinant is added to the cement an emulsion is set up on mixing and when the particles have been coated an emitted film will surround them. When the moisture is being supplied to the cement by the injection or filtration methods described above, it may be in the form of a water emulsion containing the above agglutinants or it may be a vapor carrying the same.

Also, no matter what type of coating has been applied to the particles, I may, preferably after the cementitious coating has set, recoat the particles with any of the types of agglutinants I have mentioned. This preferably may be done in such instances where no agglutinant has been added to the first coating, to prevent dusting of the hardened inner coating of cement and in such instance it is preferably a transparent one. It is also contemplated in certain instances to use a heat hardening synthetic resin and after coating the previously coated cementitious colored particles, to bake them at preferably low temperatures in suitable chambers until the resin coating has dried and hardened. A high alumina cement coating is preferred in such a structure as once hardened it is substantially unaffected by heating and cooling.

I have found it desirable when certain cements of the lime liberating type are used to charge the liquid ingredient where a wash coating of cement is used, with carbon dioxide or other suitable gases or liquids, or where the injection or filtration methods are used to combine said gas or liquids with the elements of same or to treat the particles therewith before the coating has set. I have found such additions will aid in retarding efflorescence, even though present during the period in which the cement takes its first set.

As a part of the process I also contemplate producing by suitable means colored particles from liquid or semi-liquid materials or mixtures that will be changed to the solid or semi-solid state during said process and of thereafter coating said particles if desired by any of the means heretofore mentioned. Such a method contemplates the propelling, for instance, by centrifugal means, spraying, etc., of globules of said liquids or semi-liquids into space in a suitable chamber, preferably with suitable temperature control, so that the resultant solidification takes place before their landing on a collection surface. Such material as cement, pitch, tar, asphalt, sodium silicate, glue, quick-drying paint, molten slag, phenolic resin, are examples of materials that may be employed in carrying out the process.

The natural or colored coated particles made by any of the processes hereinbefore described may be utilized in the continuous manufacture of shingles from a moving web of composition material wherein a moving web is saturated with a suitable waterproofing substance, for instance, a high melting point asphalt and is provided with a surface coating, of for instance, a low melting point asphalt. Before the coating has fully set the coated particles of the invention are fed from a suitable means, for instance, a hopper, and spread over the web and are then partially embedded therein by passing around suitable embedding rolls. The coated granule studded web is then cut into shingle sizes of any desired form and size.

From the foregoing description it can be appreciated that I have presented entirely new coated granules and processes of making coated particles which may be of natural or other color and that the coatings applied, when set and hardened, may be of a durable and soluble nature, that their color may be intimately bound in and be permanent, that the processes employed are simple to carry out and economical; that I can utilize inexpensive particles of a porous type that ordinarily when exposed to the elements would disintegrate, and, by proceeding in accordance with the foregoing description I produce discrete, individual, mobile particles having a hardened cementitious coating, useful as a grit surfacing for roofing material to protect the asphalt coating thereon from the atmospheric elements, and to provide when desired a means of obtaining permanent coloration, ornamentation and designs. Also, these may be employed as studding in cement blocks or other building materials.

It will be evident that many changes may be made in the coated granules and processes of making them, and it is therefore desired that the invention be construed, including equivalents and as broadly as the claims, taken in conjunction with the prior art, may allow.

I claim:

1. As an article of manufacture, a roofing granule having on the exterior thereof a coating comprising a hardened high alumina cement containing principally calcium aluminates or calcium alumina ferrites and substantially free of free lime in amount to produce objectionable efflorescence in exposure, the surface of said granule being also substantially resistant to chipping and wear and stable with respect to a bituminous bond.

2. As an article of manufacture, a coated granule for roofing comprising an individual granule core adapted to tenaciously anchor a cement coating and a hardened and dense but substantially light coating enveloping said core comprising a high alumina cement substantially free of free lime, said coating being substantially free of objectionable efflorescence in exposure and being substantially resistant to chipping and wear and stable with respect to a bituminous bond.

3. As an article of manufacture, a coated granule for roofing, comprising an individual granule core adapted to anchor a cement coating and a hardened and dense color coating enveloping said core, comprising color pigment and a high alumina cement substantially free of free lime, said coating being substantially free of objectionable efflorescence in exposure, having substantial color permanence, and being substantially stable with respect to a bituminous bond.

4. As an article of manufacture, a roofing granule comprising an individual granule core element adapted to tenaciously anchor a cementitious coating, and a hardened and dense coating element enveloping said core, comprising a high alumina cement, one of said elements including a small amount of set accelerating agent for said coating and said coating being substantially free of objectionable efflorescence in exposure and being substantially resistant to chipping and wear and substantially stable with respect to a bituminous bond.

5. As an article of manufacture, a roofing granule comprising an individual mineral slag core containing active lime and a dense casing enveloping said core comprising a hardened high alumina cement coating substantially free of free lime, said active lime being reacted with said coating to accelerate its set and produce a chemical bond between core and casing, and said casing being substantially free of objectionable efflorescence in exposure and being substantially resistant to chipping and wear and stable with respect to a bituminous bond.

6. A process of producing cement coated roofing granules comprising mixing individual granules with a composition comprising a high alumina cement substantially free of free lime in amount to produce objectionable efflorescence during curing or exposure, keeping the mixture in motion to fully coat the granules, agitating the coated granules until the coatings have initially set and maintaining the coated granules under controlled moisture conditions while hardening.

7. A process of producing colored cement coated roofing granules comprising mixing individual granules with a composition comprising a high alumina cement substantially free of free lime in amount to produce objectionable efflorescence in curing or exposure, a coloring agent, and a small amount of set accelerator for the cement, keeping the mixture in motion to fully coat the granules and to keep the ingredients of the composition well distributed, agitating the coated granules until the coatings have initially set and maintaining the coated granules under controlled moisture conditions while hardening.

8. As an article of manufacture, a coated surfacing element for roofing comprising an individual core including in its surface a multiplicity of irregular pitted crevices and a hardened and dense coating enveloping said core comprising high alumina cement substantially free of free lime, said coating being tenaciously anchored to said crevice-like surface and said coating being substantially free of objectionable efflorescence in exposure and being substantially resistant to chipping and wear and substantially stable with respect to a bituminous bond.

9. As an article of manufacture, a roofing granule including a core comprising hydraulic cementitious ingredients and a dense coating enveloping said core comprising a high alumina cement coating substantially free of free lime but containing calcium aluminates or calcium alumina ferrites, said coating being structurally anchored to said core and being bonded by a chemical reaction product of core and coating, and said coating being substantially free of objectionable efflorescence in exposure and being substantially resistant to chipping and wear and substantially stable with respect to a bituminous bond.

10. A process of producing cement coated surfacing elements for roofing comprising coating comminuted mineral cores with coating material comprising a high alumina cement substantially free of free lime in amount to produce objectionable efflorescence during curing or exposure, coating said cores such that the individual cores are enveloped with a layer of coating material, and keeping the coated cores in motion to substantially prevent bonding between them.

NORMAN P. HARSHBERGER.